(12) United States Patent
Ewens et al.

(10) Patent No.: US 9,896,960 B2
(45) Date of Patent: Feb. 20, 2018

(54) ADAPTIVE MODEL-BASED METHOD TO QUANTIFY DEGRADATION OF A POWER GENERATION SYSTEM

(71) Applicant: General Electric Company, Schenectady, NY (US)

(72) Inventors: David Spencer Ewens, Greer, SC (US); Frederick William Block, Campobello, SC (US); William Forrester Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/175,258

(22) Filed: Jun. 7, 2016

(65) Prior Publication Data
US 2017/0350271 A1    Dec. 7, 2017

(51) Int. Cl.
*F01D 21/00*       (2006.01)
*F01D 25/00*       (2006.01)
(Continued)

(52) U.S. Cl.
CPC ......... *F01D 21/003* (2013.01); *F01D 25/002* (2013.01); *G05B 13/041* (2013.01);
(Continued)

(58) Field of Classification Search
CPC ... F01D 21/003; F01D 25/002; G05B 13/041; F05D 2270/11; F05D 2260/81; F05D 2270/44; F05D 2220/32
See application file for complete search history.

(56) References Cited

U.S. PATENT DOCUMENTS 7,742,904 B2 *   6/2010  Healy ................... G05B 13/04
                                                    700/287
2008/0140352 A1 *  6/2008  Goebel .............. G05B 19/4184
                                                    702/183
(Continued)

FOREIGN PATENT DOCUMENTS

EP         2549415 A1    1/2013
EP         2570616       3/2013
WO         2015149928    10/2015

OTHER PUBLICATIONS

U.S. Appl. No. 15/132,963, filed Apr. 19, 2016, Frederick William Block.
EP search Report dated Nov. 30, 2017.

*Primary Examiner* — Rodney Butler
(74) *Attorney, Agent, or Firm* — Fletcher Yoder, P.C.

(57) ABSTRACT

A system includes a power generation system and a controller that controls the power generation system. The controller includes a processor that generates a model of the power generation system that estimates a value for a first parameter of the power generation system. The processor also receives a measured value of the first parameter. The processor further adjusts a correction factor of the model such that the estimated value of the first parameter output by the model is approximately equal to the measured value of the first parameter. The processor also generates a transfer function that represents the correction factor as a function of a second parameter of the power generation system. The processor further displays the transfer function along with one or more previously generated transfer functions to quantify degradation of the power generation system.

20 Claims, 4 Drawing Sheets

(51) Int. Cl.
*G05D 13/04* (2006.01)
*G05B 13/04* (2006.01)

(52) U.S. Cl.
CPC ...... *F05D 2220/32* (2013.01); *F05D 2260/81* (2013.01); *F05D 2270/11* (2013.01); *F05D 2270/44* (2013.01)

(56) References Cited

U.S. PATENT DOCUMENTS

| | | |
|---|---|---|
| 2010/0280730 A1 | 11/2010 | Page et al. |
| 2011/0077783 A1 | 3/2011 | Karpman et al. |
| 2012/0072194 A1* | 3/2012 | Arnold .................... F02C 7/057 703/7 |
| 2013/0024179 A1* | 1/2013 | Mazzaro ................ G06Q 10/04 703/18 |
| 2013/0054213 A1 | 2/2013 | Rohm, III et al. |
| 2013/0066615 A1* | 3/2013 | Morgan ............... G05B 13/048 703/7 |
| 2014/0058534 A1* | 2/2014 | Tiwari ................... G05B 13/04 700/9 |
| 2014/0260312 A1* | 9/2014 | Davis, Jr. .................. F02C 9/28 60/783 |
| 2016/0116374 A1 | 4/2016 | Strelec et al. |

\* cited by examiner

ADAPTIVE MODEL-BASED METHOD TO QUANTIFY DEGRADATION OF A POWER GENERATION SYSTEM

BACKGROUND

The present disclosure relates generally to power generation systems. In particular, the present disclosure relates to control systems for power generation systems.

A physics-based software model may be used to model operations of a power generation system (e.g., a gas turbine). A control system for the power generation system may use outputs of the model, including parameters that are not or cannot be measured, to control the power generation system. During operation of the control system, the control system may adjust certain correction factors of the model to match live measurements of the power generation system to improve the accuracy of the model. Comparison of model outputs, or measurements, over time may be a way to quantify degradation. However, this method may be influenced by factors or parameters beyond degradation, such as machine-to-machine manufacturing variation in the power generation system, errors in the base model, errors that correspond to ambient and operating conditions, and uncertainty and errors in inputs to the model.

BRIEF DESCRIPTION

Certain embodiments commensurate in scope with the originally claimed invention are summarized below. These embodiments are not intended to limit the scope of the claimed embodiments, but rather these embodiments are intended only to provide a brief summary of possible forms of the invention. Indeed, the presently claimed embodiments may encompass a variety of forms that may be similar to or different from the embodiments set forth below.

In a first embodiment, a system includes a power generation system and a controller that controls the power generation system. The controller includes a processor that generates a model of the power generation system that estimates a value for a first parameter of the power generation system. The processor also receives a measured value of the first parameter. The processor further adjusts a correction factor of the model such that the estimated value of the first parameter output by the model is approximately equal to the measured value of the first parameter. The processor also generates a transfer function that represents the correction factor as a function of a second parameter of the power generation system. The processor further displays the transfer function along with one or more previously generated transfer functions to quantify degradation of the power generation system.

In a second embodiment, a method includes generating, by a processor, a model of a gas turbine that estimates a value for a first parameter of the gas turbine. The method also includes receiving, by the processor, a measured value of the first parameter. The method further includes adjusting, by the processor, a correction factor of the model such that the estimated value of the first parameter output by the model is approximately equal to the measured value of the first parameter. The method also includes generating, by the processor, a transfer function that represents the correction factor as a function of a second parameter of the gas turbine. The method further includes displaying, by the processor, the transfer function along with one or more previously generated transfer functions to quantify degradation of the gas turbine.

In a third embodiment, a tangible, non-transitory, machine-readable-medium, includes machine-readable instructions to cause a processor to generate a model of a power generation system that estimates a value for a first parameter of the power generation system. The machine-readable instructions also cause a processor to receive a measured value of the first parameter. The machine-readable instructions further cause a processor to adjust a correction factor of the model such that the estimated value of the first parameter output by the model is approximately equal to the measured value of the first parameter. The machine-readable instructions also cause a processor to generate a transfer function that represents the correction factor as a function of a second parameter of the power generation system. The machine-readable instructions further cause a processor to display the transfer function along with one or more previously generated transfer functions to quantify degradation of the power generation system.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

Figure 1:
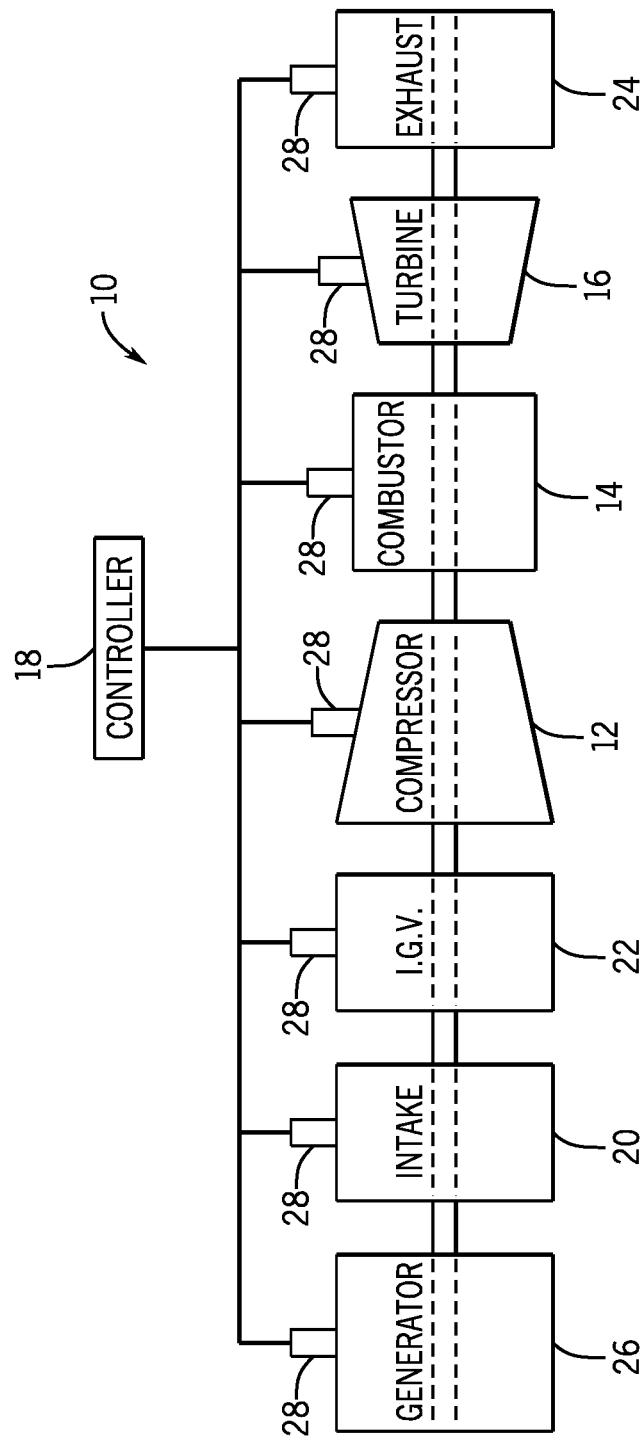
FIG. 1 is a block diagram of a gas turbine, in accordance with an embodiment of the present disclosure.

One or more specific embodiments of the presently disclosed embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including,"

and "having" are intended to be inclusive and mean that there may be additional elements other than the listed elements.

A physics-based software model may be used to model operations of a power generation system (e.g., gas turbine system, steam turbine system, wind turbine system, hydro-turbine system, combustion engine, hydraulic engine, electric generator, and the like). The control system for the power generation system may use outputs of the model, including parameters that are not or cannot be measured, to control the power generation system. During operation of the control system, the control system may adjust certain correction factors of the model to match outputs of the model to live measurements of the power generation system to improve the accuracy of the model. Performance of the correction factor adjustments may be correlated and represented via a mathematical function of one or more relevant parameters over time. The correlation function may be generated at some frequency based on sets of data over time. The historical correlation functions may then be compared to quantify degradation of the component related to the correction factor adjustments of the modeled power generation system. In one embodiment, a system includes a power generation system and a controller that controls the power generation system. The controller includes a processor that generates a model of the power generation system that estimates a value for a first parameter of the power generation system. The processor also receives a measured value of the first parameter. The processor further adjusts a correction factor of the model such that the estimated value of the first parameter output by the model is approximately equal to the measured value of the first parameter. The processor also generates a transfer function that represents the correction factor as a function of a second parameter of the power generation system. The processor further displays the transfer function along with one or more previously generated transfer functions to quantify degradation of the power generation system.

FIG. 1 is a block diagram of a power generation system (e.g., a gas turbine) 10 having a compressor 12, combustor 14, turbine 16, and a controller 18, in accordance with an embodiment of the present disclosure. An intake duct 20 may feed ambient air to the compressor 12. The intake 20 may include ducts, filters, screens, and/or sound-absorbing devices that contribute to pressure loss of the ambient air flowing through the intake 20 into inlet guide vanes 22. An exhaust duct 24 may include sound-absorbing materials and emission control devices that apply a backpressure to the turbine 16. The amount of intake pressure loss and back pressure may vary over time due to the addition of components to and dust and dirt clogging the intake duct 20 and the exhaust duct 24. The turbine 16 may drive a generator 26 that produces electrical power.

The operation of the gas turbine 10 may be monitored by one or more sensors 28 that may detect various observable conditions of one or more components of the gas turbine 10 (e.g., the generator 26, the intake 20, etc.) and/or the ambient environment. In some embodiments, a plurality of redundant sensors may be used to measure the same measured condition. For example, a plurality of redundant temperature sensors 28 may monitor ambient temperature surrounding the gas turbine 10, compressor discharge temperature, turbine exhaust gas temperature, and other temperature measurements of the gas stream through the gas turbine 10. Similarly, a plurality of redundant pressure sensors 28 may monitor ambient pressure, and static and dynamic pressure levels at the intake duct 20, exhaust duct 24, and/or at other locations in the gas stream through the gas turbine 10. A plurality of redundant humidity sensors 28 (e.g., wet and/or dry bulb thermometers) may measure ambient humidity in the intake duct 20. A plurality of redundant sensors 28 may also include flow sensors, speed sensors, flame detector sensors, valve position sensors, guide vane angle sensors, or the like, that sense various parameters pertinent to the operation of gas turbine 10.

As used herein, a "parameter" refers to a measurable and/or estimable quality that can be used to define an operating condition of the gas turbine 10, such as temperature, pressure, gas flow, or the like, at defined locations in the gas turbine 10. Some parameters are measured (i.e., sensed) and are directly known. Other parameters are estimated by a model and are indirectly known. The measured and estimated parameters may be used to represent a given turbine operating state.

The controller 18 may be a computer system having a processor(s) (e.g., a microprocessor(s)) that may execute software programs to control the operation of the gas turbine 10 using sensor inputs and instructions from human operators. Moreover, the processor may include multiple microprocessors, one or more "general-purpose" microprocessors, one or more special-purpose microprocessors, and/or one or more application specific integrated circuits (ASICS), or some combination thereof. For example, the processor may include one or more reduced instruction set (RISC) processors. The controller 18 may be coupled to a memory device that may store information such as control software, look up tables, configuration data, etc. In some embodiments, the processor and/or the memory device may be external to the controller 18. The memory device may include a tangible, non-transitory, machine-readable-medium, such as a volatile memory (e.g., a random access memory (RAM)) and/or a nonvolatile memory (e.g., a read-only memory (ROM)). The memory device may store a variety of information and may be used for various purposes. For example, the memory device may store machine-readable and/or processor-executable instructions (e.g., firmware or software) for the processor to execute, such as instructions for controlling the gas turbine 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data. In some embodiments, the controller 18 may generate commands to adjust valves of the combustor 14 that regulate the fuel flow, adjust inlet guide vanes 22, and activate other control effectors in order to control the gas turbine operation appropriately as indicated by the parameters. (e.g., setting desired exhaust temperatures or combustor fuel splits).

Figure 2:
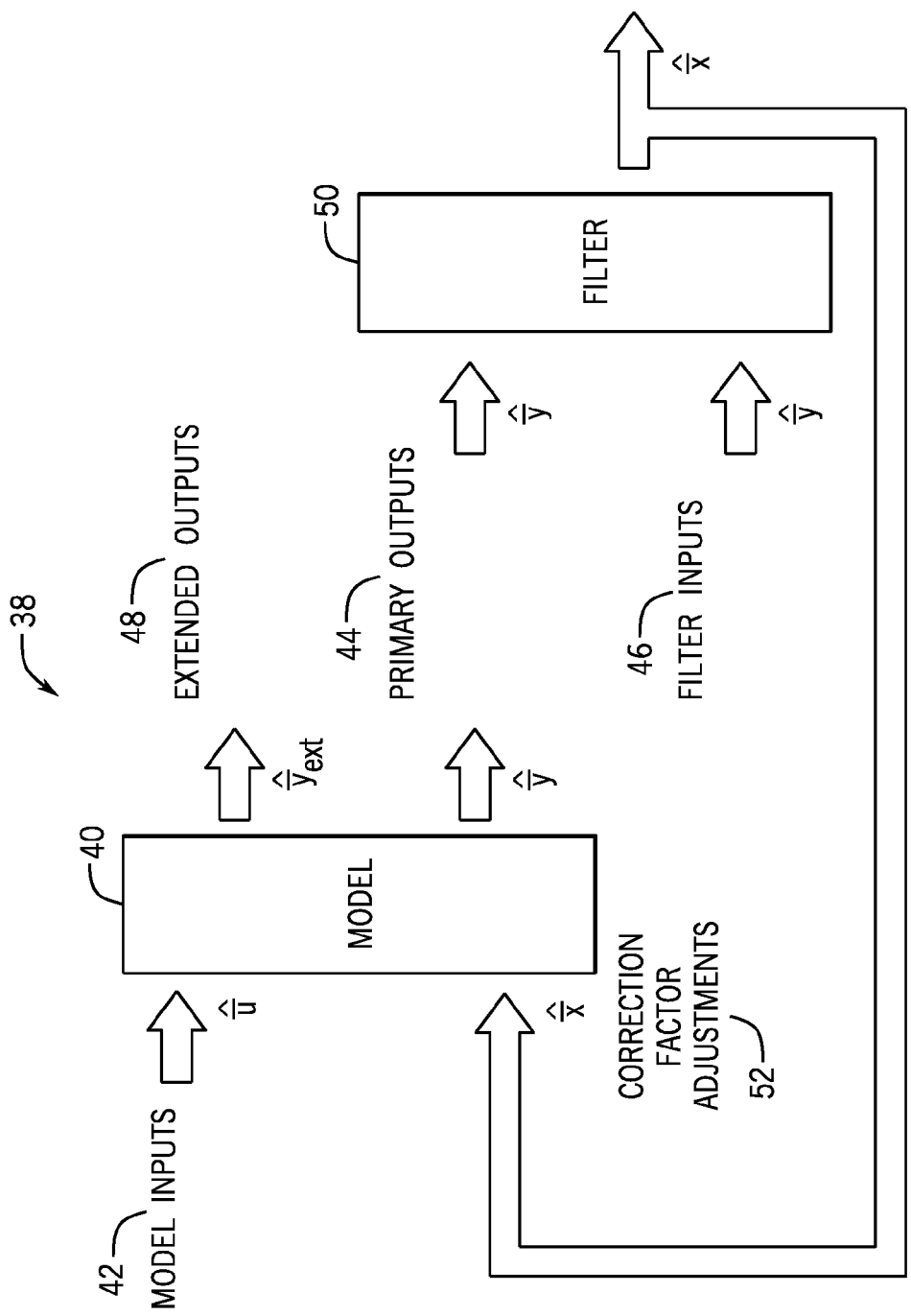
FIG. 2 is a block diagram of a model for simulating several operating parameters of the gas turbine, in accordance with an embodiment of the present disclosure.

FIG. 2 is a high-level block diagram 38 of a model 40 for simulating, in real-time, several operating parameters of the gas turbine 10, in accordance with an embodiment of the present disclosure. The model 40 may be an adaptive real-time engine simulation model (ARES). The gas turbine 10 may have several observable parameters that are referred to as model inputs (ū) 42. The model inputs 42 may be directly measured by sensors and may include, for example, ambient conditions, angle of the inlet guide vanes 22, amount of fuel flowing to the combustor 14, rotational speed of the gas turbine 10, and the like. The model inputs 42 are exemplary and are provided to illustrate that sensed inputs are collected. The specific sensed model inputs are not material to this disclosure and will depend on the control system and available sensors at a particular gas turbine installation.

As shown in FIG. 2, the model inputs (ū) 42 are input to the model 40 of the gas turbine 10. The model inputs 42 are applied by the model 40 to generate output values of the model 40 corresponding to simulated operating parameters of the gas turbine 10. The model outputs include primary outputs (ŷ) 44 that may be compared to corresponding measured operating parameters of the gas turbine 10. The modeled outputs may also include extended modeled outputs (ŷ ext.) 48 that predict gas turbine parameters that are not directly measured (e.g., desired fuel flow rate). The extended modeled outputs 48 may be used by the controller 18 to operate the gas turbine 10, such as by applying a desired fuel flow rate to control an extended output parameter to maintain within a predefined limit.

The primary outputs 44 and their corresponding measured operating parameters (e.g., filter inputs 46) may include, but are not limited to, generator or power output, exhaust temperature (e.g., turbine exhaust temperature), compressor condition (e.g., compressor pressure ratio), and the like, or any combination thereof. The primary outputs 44 and the filter inputs 46 are provided to an error correction system or filter 50 (e.g., a Kalman filter gain matrix) that automatically and regularly adjusts or tunes the model 40 to more accurately fit the modeled output 44 to the measured filter inputs 46 of the gas turbine 10. In some embodiments, the filter 50 adjusts or tunes the model 40 to fit one or more modeled output 44 of the model 40 to one or more measured filter inputs 46 of the gas turbine 10. The modeled outputs 44, 48 may predict gas turbine states that may be used for control, schedule maintenance for, and predict the performance of the gas turbine 10.

The primary outputs (ŷ) 44 of the model may be, for example, a modeled power output (e.g., to the generator 26), a modeled exhaust temperature, modeled compressor conditions, and the like. The number and particular parameters corresponding to the primary outputs 44 may vary between different gas turbine models. Further, the primary outputs 44 may vary during operation of the gas turbine 10.

Each of the primary outputs 44 correspond to a measured (e.g., sensed) filter input (y) 46, such as an actual power output, exhaust temperature, compressor condition, and the like. The filter inputs 46 are based on one or more output signals of sensors monitoring a corresponding actual parameter of the gas turbine 10. Multiple redundant sensors may observe each of the parameters. The parameters are selected based on the specific control system for a gas turbine 10 and available sensors.

The model 40 may be a computer-generated model of the gas turbine 10. In some embodiments, the model 40 may be an arrangement of mathematical representations of the primary outputs 44 and extended outputs 48. Each of these representations may rely on input values (e.g., model inputs 42), to generate an estimated value of a modeled output parameter (e.g., 44, 48). The mathematical representations may generate a surrogate output parameter value (e.g., 44, 48) that may be used in circumstances where a measured parameter value is not available. The model 40 may be a physics-based aero-thermodynamic computer model, a regression-fit model, neural-net model, or other suitable computer model of a power generation system.

In certain embodiments, the primary outputs 44 may be compared to the measured filter inputs 46 to generate a difference signal. The filter inputs 46 (y) are input into the filter 50 to tune the model 40. In some embodiments, the primary outputs 44 and filter inputs 46 may be normalized to generate normalized modeled outputs, which may then be compared to generate the difference signal. The difference signal may indicate an error of a modeled output parameter with respect to the corresponding measured parameter. In some embodiments, there is at least one difference signal corresponding to each of the primary outputs 44, and there may be a difference signal corresponding to each of the redundant sensors 28 measuring a particular parameter. In some embodiments, if a filter input 46 is unavailable (e.g., due to a failed sensor), the corresponding difference signal may not be generated. However, the error correction system may still operate and tune the model 40 based on other filter inputs 46 that are available.

The filter 50 (e.g., a Kalman filter gain matrix) may receive one or more of the difference signals and generate one or more correction factor adjustments 52 (e.g., component performance multipliers) of the gas turbine model 40 which may be used to tune the model 40. In some embodiments, the correction factor adjustment 52 may correspond to a parameter of the gas turbine 10 (e.g., compressor airflow). In particular, the filter 50 may use partial derivative analysis and/or normalization to determine a matrix of optimal tuning or gain values to be applied to the difference signals. The matrix may then generate the correction factor adjustments 52, which may then be applied to the model 40.

By matching the primary outputs 44 of the model 40 to live measurements (i.e., filter inputs 46), model 40 may include other sources of variation in addition to the tuning parameters, such as machine-to-machine manufacturing variation in the gas turbine 10, degradation of the gas turbine 10 over time, errors in the base model, errors that correspond to ambient and operating conditions, uncertainty and errors in inputs to the model 40, and the like. As such, quantifying the degradation of the gas turbine 10 over time based solely on tuning parameters may be complicated by the contribution of these multiple sources of variation.

Figure 3:
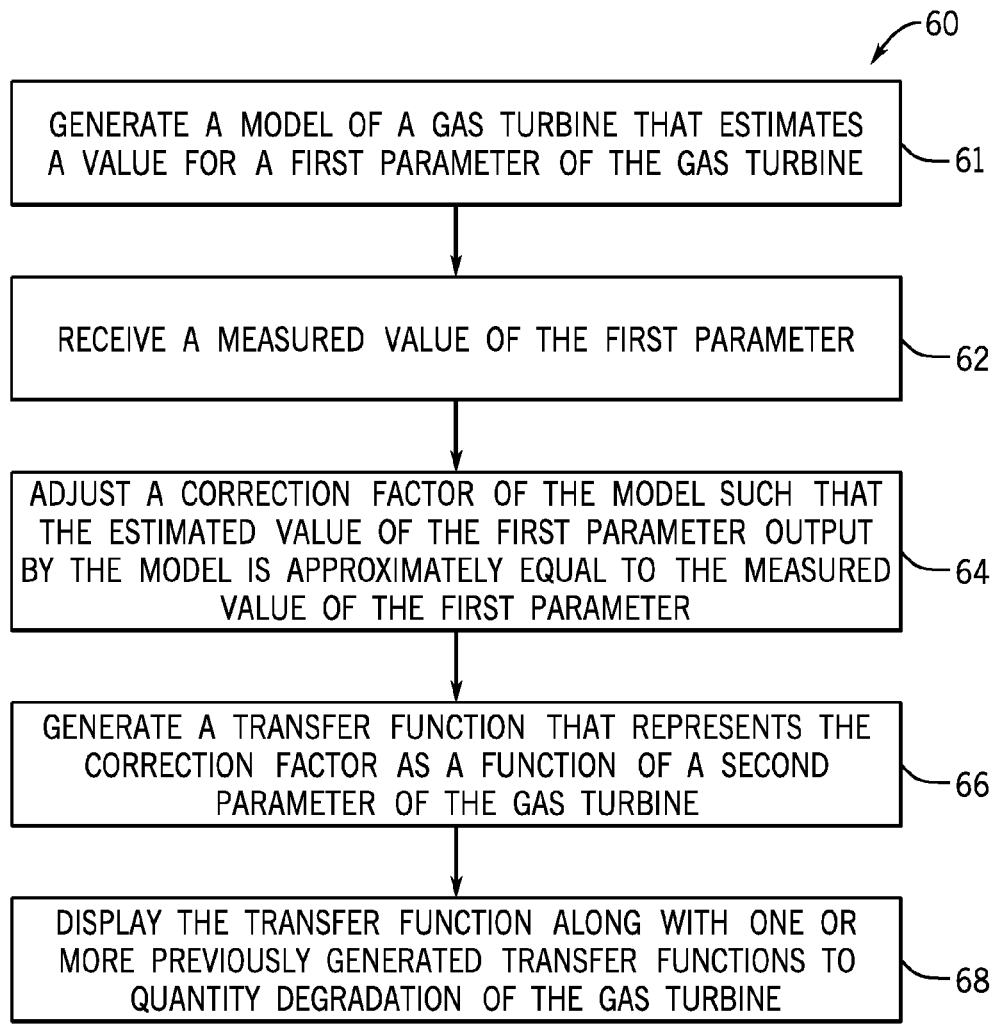
FIG. 3 is a flowchart of a method for quantifying degradation of a power generation system (e.g., the gas turbine), in accordance with an embodiment of the present disclosure.

With this in mind, FIG. 3 is a flowchart of a method 60 for quantifying degradation of a power generation system (e.g., the gas turbine 10) and account for at least some of the additional sources of variation, in accordance with an embodiment of the present disclosure. In certain embodiments, the controller 18 may perform the method 60, but it should be noted that any suitable computing system may perform method 60.

Referring now to FIG. 3, the controller 18 generates (block 61) a model 40 of the gas turbine 10 that estimates a value for a first parameter of the gas turbine 10. In some embodiments, the first parameter may be a primary output 44 estimated by the model 40 of FIG. 2 (e.g., the adaptive real-time engine simulation model (ARES)). For example, the controller 18 may estimate a compressor discharge pressure of the gas turbine 10 by generating the model 40 of the gas turbine 10.

The controller 18 then receives (block 62) a measured value of the first parameter. In some embodiments, the first parameter may be a filter input 46 measured by one or more sensors of the gas turbine 10. For example, the controller 18 may measure the compressor discharge pressure of the gas turbine 10 by receiving information from one or more sensors of the gas turbine 10 related to compressor pressure.

The controller 18 adjusts or tunes (block 64) a correction factor 52 of the model 40, such that the estimated value of the first parameter output by the model 40 (from block 61) is approximately equal or matches the measured value of the parameter (from block 62). In some embodiments, the controller 18 may adjust the correction factor 52 such that the estimated value of the primary output 44 output by the model 40 is approximately equal or matches the measured value of the filter input 46. For example, the controller 18 may match the primary output 44 value corresponding to the compressor discharge pressure (a modeled value) to the filter input 46 value corresponding to the compressor discharge pressure (a measured value) by adjusting a correction factor 52 corresponding to a compressor airflow. The present example adjusts one correction factor 52, but other embodiments of the present disclosure include adjusting more than one correction factor 52.

The controller 18 generates (block 66) a transfer function that represents the correction factor adjustment 52 as a function of a second parameter of the gas turbine 10. The second parameter is a relevant measured parameter of the gas turbine 10 that, when varied, may result in a change in the model 40 such that the estimated value of the first parameter may also change. In some embodiments, the second parameter is the model input 42. In some embodiments, the second parameter may be a relevant measured parameter of the gas turbine 10 that is not the model input 42. A transfer function is a mathematical representation expressing one or more outputs of a system as a function of one or more inputs of the system. For example, the second parameter may be a compressor pressure ratio, and the transfer function may represent the correction factor adjustment of a modeled compressor airflow as a function of the compressor pressure ratio, where the transfer function is in the form of a quadratic formula:

$$f_{transfer}(CPR) = k_1 * CPR^2 + k_2 * CPR + k_3 \quad (1)$$

where:
  $f_{transfer}(CPR)$ is the transfer function and represents the correction factor adjustment of the modeled compressor airflow;
  CPR is the measured compressor pressure ratio; and
  $k_1$, $k_2$, and $k_3$ are constants.

The transfer function as shown in Equation 1 may similarly be applied to other correction factor adjustments 52. The transfer function may be generated using multiple values in time for the correction factor adjustment 52 and the relevant measured parameter(s) (as determined in block 62). In particular, the transfer function may be generated and/or adjusted by using a fit routine to determine the values of constants $k_1$, $k_2$, and $k_3$. In some embodiments, the fit routine is used to determine one or more values of one or more constants of the transfer function.

The controller 18 may then display (block 68) the transfer function to previously generated transfer functions to quantify degradation of the gas turbine 10. In some embodiments, the controller 18 may store transfer functions that were previously generated in a memory device coupled to the controller 18. The controller 18 may display the current transfer function along with the saved and previously generated transfer functions. In some embodiments, the controller 18 compares the transfer function to one or more previously generated transfer functions by comparing one or more reference points of the transfer function to one or more corresponding reference points associated with the one or more previously generated transfer functions. In this manner, the controller 18 may quantify degradation of the gas turbine 10.

Figure 4:
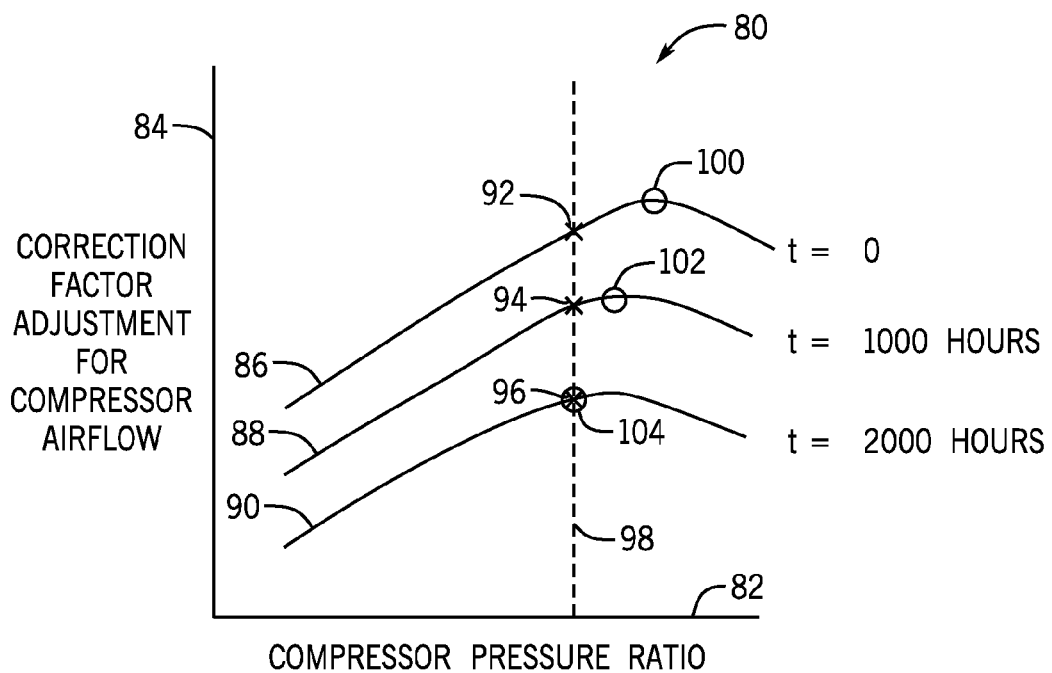
FIG. 4 is a plot of transfer functions for correction factor adjustment for compressor airflow in the gas turbine, in accordance with an embodiment of the present disclosure.

For example, FIG. 4 is a plot 80 of transfer functions for the correction factor adjustment 52 of the compressor airflow in the gas turbine 10, in accordance with an embodiment of the present disclosure. The horizontal axis 82 represents the compressor pressure ratio that corresponds to the second parameter, compressor pressure ratio, and the vertical axis 84 represents the correction factor adjustment 52 of the compressor airflow. Transfer functions 86, 88, 90 are plotted representing condition of the gas turbine 10 at three different times: when the gas turbine 10 is new and clean (as depicted by transfer function 86); the gas turbine 10 operating after 1000 hours of operation (transfer function 88); and the gas turbine 10 operating after 2000 hours of operation (transfer function 90). Each transfer function 86, 88, 90 has been generated as discussed in block 68 and represents a range of correction factor adjustments of compressor airflow as a function of a range of compressor pressure ratios during different times of operation by the gas turbine 10.

Quantifying degradation of the gas turbine 10 may be achieved by viewing and/or comparing the transfer functions at one or more reference points defined by values of the second parameter (e.g., the compressor pressure ratio 82) of the transfer function. For example, as shown in the plot 80, degradation of the gas turbine after 1000 hours of operation is evidenced by the difference between the correction factor adjustment 52 after 1000 hours of operation 94 and when the gas turbine is new and clean 92, at a certain compressor pressure ratio value 98. Degradation of the gas turbine after 2000 hours of operation is evidenced by the difference between the correction factor adjustment 52 after 2000 hours of operation 96 and when the gas turbine is new and clean 92, at the certain compressor pressure ratio value 98.

The change in airflow over the time of operation of the gas turbine 10 may impact operational points of the gas turbine 10 that are based on control strategy. A typical assessment of degradation of the gas turbine 10 may result in the open circles in 100, 102, 104, which illustrate that the operating condition (i.e., compressor pressure ratio) is changing over time as the result of the degradation coupled with the control strategy. Because compressor degradation may result in a shift in the operation of the gas turbine 10, comparison of the compressor airflow at the operational condition over time may not be a reliable representation of compressor degradation alone. The comparison of the open circles 100, 102, 104 captures compressor degradation, but may be confounded by the shift in the operating condition. Using the transfer function as described in the present disclosure to filter out the shift in the operating condition may segregate the compressor airflow loss over time due to compressor fouling/degradation from the change in compressor airflow due to the change in operating conditions. As shown in the plot 80, degradation of the gas turbine 10 after 1000 hours of operation is evidenced by the difference between the correction factor adjustment for compressor airflow after 1000 hours of operation 94 and when the gas turbine 10 is new and clean 92, at a certain compressor pressure ratio value 98. Degradation of the gas turbine 10 after 2000 hours of operation is evidenced by the difference between the correction factor adjustment after 2000 hours of operation 96 and when the gas turbine 10 is new and clean 92, at the certain compressor pressure ratio value 98. By using the transfer function, the effect of the other sources of variation (mentioned above) on the data points 92, 94, 96, when quantifying degradation, may be reduced, resulting in greater accuracy.

Figure 5:
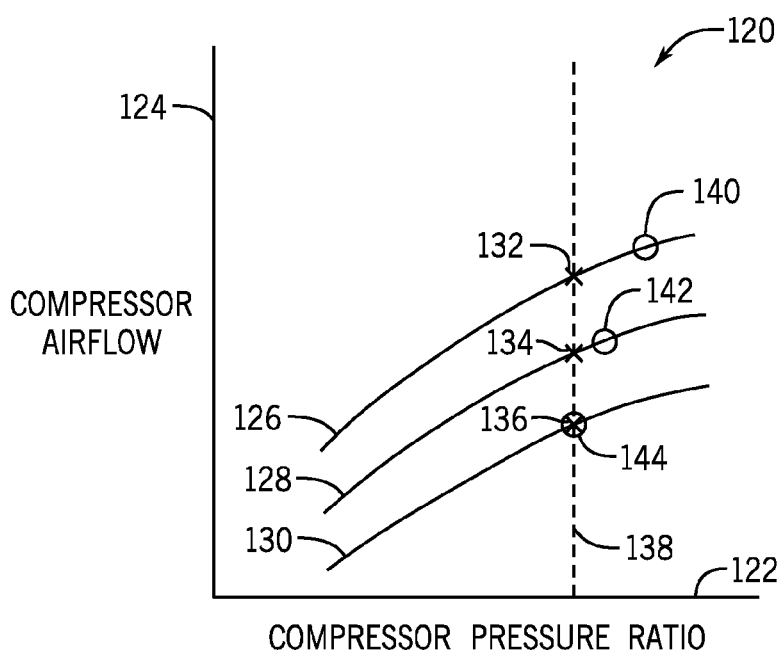
FIG. 5 is a plot of transfer functions for compressor airflow in the gas turbine, in accordance with an embodiment of the present disclosure, in accordance with an embodiment of the present approach.

By using the transfer function, which is based on multiple data points, the contribution of other sources of variation, such as uncertainty and errors in inputs to the model 40, and the like, when quantifying degradation of the gas turbine 10, may be filtered out. In particular, by using the transfer function, the effect of other sources of variation on the data points 92, 94, 96 may be reduced, resulting in greater accuracy. Variation due to machine to machine degradation and errors in the base model are filtered as a result of the construction of the transfer functions, and the effect of these variations may be reduced in the computation of degradation by a relative comparison of transfer functions. As such, using the transfer function as described above results in quantifying degradation of the gas turbine with a higher degree of accuracy The model inputs 42, which may represent the operating conditions described above, and the transfer functions 86, 88, 90, corresponding to the correction factor adjustment 52, may be used to generate and run the model 40 (e.g., the ARES model) of the gas turbine 10 and estimate an output of the gas turbine. For example, FIG. 5 is a plot 120 of transfer functions for compressor airflow in the gas turbine 10, in accordance with an embodiment of the present disclosure. The model 40 estimates an extended modeled output 48, the compressor air flow, for various gas turbine operating conditions across the typical range compressor pressure ratio values during normal operation of the gas turbine. 10. The horizontal axis 122 represents the compressor pressure ratio which corresponds to the second parameter, and the vertical axis 124 represents the compressor airflow (that corresponds to an extended modeled output 48). Transfer functions 126, 128, 130 are plotted representing the operating conditions of the gas turbine 10 at three different times: the gas turbine 10 new and clean (as depicted by transfer function 126); the gas turbine 10 operating after 1000 hours of operation (transfer function 128); and the gas turbine 10 operating after 2000 hours of operation (transfer function 130). Each transfer function 126, 128, 130 has been generated as discussed in block 68 and represents a range of compressor airflow values as a function of a range of compressor pressure ratios during different times of operation by the gas turbine 10.

A typical assessment of degradation of the gas turbine 10 may result in the open circles in FIG. 5, 140, 142, 144, which illustrate that the operating condition (i.e., compressor pressure ratio) is changing over time as the result of the degradation coupled with the control strategy. The comparison of the open circles 140, 142, 144 captures compressor degradation, but may be confounded by the shift in the operating condition. Using the transfer function as described in the present disclosure to filter out the shift in the operating condition may segregate the compressor airflow loss over time due to compressor fouling/degradation from the change in compressor airflow due to the change in operating conditions. As shown in the plot 120, degradation of the gas turbine 10 after 1000 hours of operation is evidenced by the difference between the compressor airflow value after 1000 hours of operation 134 and when the gas turbine 10 is new and clean 132, at a certain compressor pressure ratio value 138. Degradation of the gas turbine 10 after 2000 hours of operation is evidenced by the difference between the compressor airflow value after 2000 hours of operation 136 and when the gas turbine 10 is new and clean 132, at the certain compressor pressure ratio value 138. By using the transfer function, the effect of the other sources of variation on the data points 132, 134, 136, when quantifying degradation, may be reduced, resulting in greater accuracy.

In some embodiments, the controller 18 may control the gas turbine 10 based on the degradation of the gas turbine 10. For example, a threshold degradation value may be determined or selected, wherein, when the degradation of the gas turbine 10 exceeds the threshold degradation value, the controller 18 may schedule maintenance of the gas turbine 10 and/or send an alert or message to a computing system. The computing system may monitor the gas turbine 10, monitor alerts or messages of industrial systems or devices, and/or enable communications to users associated with the gas turbine 10. In the example where the degradation of the gas turbine 10 is related to compressor airflow and/or pressure, the maintenance may include cleaning and/or restoring components of the compressor 12, intake duct 20, and/or inlet guide vanes 22 (e.g., via a compressor water wash). In other words, the controller 18 may initiate a compressor wash cycle for the gas turbine 10 based at least in part on the degradation of the gas turbine 10. In another embodiment, the controller 18 may reduce output of the gas turbine 10 until the degradation of the gas turbine 10 is above the threshold degradation value.

Technical effects of the subject matter disclosed herein include, but are not limited to, receiving a measured value of a parameter of a power generation system that is estimated by a model of a control system of the power generation system. The power generation system may include a gas turbine system, steam turbine system, wind turbine system, hydroturbine system, combustion engine, hydraulic engine, electric generator, and the like. The model may be an adaptive real-time engine simulation model. Technical effects also include adjusting a model input of the model such that a modeled value of the parameter is approximately equal to the measured value of the parameter. In particular, the model input may be adjusted such that the resulting modeled value matches the measured value. Technical effects further include generating a transfer function that represents the model input as a function of the parameter, based on the measured value of the parameter. The transfer function may be in the form of a quadratic formula, and may be generated or adjusted using a fit routine. Technical effects also include displaying the transfer function along with previously generated transfer functions to quantify degradation of the power generation system. In some embodiments, the previously generated transfer functions are stored in a memory device of the control system of the power generation system. Based on the degradation of the power generation system, the control system may control the power generation system. For example, if the degradation surpasses a certain threshold, the control system may schedule maintenance or restoration of the power generation system to reduce degradation.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
a power generation system comprising an engine, a turbine, a generator, or any combination thereof;
a controller configured to control the power generation system, comprising a processor, wherein the processor is configured to:

generate a model of the power generation system that estimates a plurality of estimated values for a first parameter of the power generation system;

receive a plurality of measured values associated with the first parameter;

adjust a plurality of correction factors of the model that cause the plurality of estimated values of the first parameter output by the model to be approximately equal to the plurality of measured values associated with the first parameter;

generate a plurality of transfer functions that represent the plurality of correction factors as functions of a second parameter of the power generation system and filter out shifts in operating conditions;

quantify degradation of the power generation system by comparing the plurality of transfer functions to each other; and schedule maintenance of the power generation system when the degradation of the power generation system exceeds a threshold degradation value.

2. The system of claim 1, wherein each transfer function of the plurality of transfer functions comprises summing:

a first product of a first constant and a squared value of a measured value of the second parameter;

a second product of a second constant and the measured value of the second parameter; and a third constant.

3. The system of claim 2, wherein the first constant, the second constant, and the third constant are determined using a fit routine.

4. The system of claim 1, wherein the model comprises a filter configured to fit the estimated value of the first parameter output by the model to the measured value of the first parameter.

5. The system of claim 1, wherein the controller is configured to control the power generation system based on the degradation of the engine, the turbine, the generator, or any combination thereof.

6. The system of claim 1, wherein the controller is configured to send an alert or message to a computing system based on the degradation of the power generation system.

7. The system of claim 1, wherein the controller is configured to initiate a compressor wash cycle for the power generation system based at least in part on the degradation of the power generation system.

8. A method, comprising:

generating, by a processor, a model of a gas turbine that estimates a plurality of estimated values for a first parameter of the gas turbine;

receiving, by the processor, a plurality of measured values associated with the first parameter;

adjusting, by the processor, a plurality of correction factors of the model that cause the plurality of estimated values of the first parameter output by the model to be approximately equal to the plurality of measured values associated with the first parameter;

generating, by the processor, a plurality of transfer functions that represent the plurality of correction factors as functions of a second parameter of the gas turbine and filter out shifts in operating conditions;

quantifying, by the processor, degradation of the gas turbine by comparing the plurality of transfer functions to each other; and controlling the power generation system, scheduling maintenance of the power generation system, or sending an alert based on the degradation of the power generation system.

9. The method of claim 8, wherein each transfer function of the plurality of transfer functions comprises a quadratic formula.

10. The method of claim 8, wherein the model comprises an adaptive real-time engine simulation model.

11. The method of claim 8, wherein the model comprises a filter configured to fit each estimated value of the plurality of estimated values for the first parameter output by the model to a respective measured value of the plurality of measured values associated with the first parameter.

12. The method of claim 8, wherein the filter comprises a Kalman filter gain matrix.

13. The method of claim 8, wherein comparing the plurality of transfer to each other comprises comparing one or more reference points of a first transfer function of the plurality of transfer functions to one or more corresponding reference points associated with a second transfer function of the plurality of transfer functions.

14. A tangible, non-transitory, machine-readable-medium, comprising machine-readable instructions to cause a processor to:

generate a model of a power generation system comprising an engine, a turbine, a generator, or any combination thereof, wherein the model is configured to estimate a plurality of estimated values for a first parameter of the power generation system;

receive a plurality of measured values associated with the first parameter;

adjust a plurality of correction factors of the model that cause the plurality of estimated values of the first parameter output by the model to be approximately equal to the plurality of measured values associated with the first parameter;

generate a plurality of transfer functions that represent the plurality of correction factors as functions of a second parameter of the power generation system and filter out shifts in operating conditions;

quantify degradation of the power generation system by comparing the plurality of transfer functions to each other; and control the power generation system based on the degradation of the power generation system.

15. The machine-readable-medium of claim 14, wherein each measured value of the plurality of measured values associated with the first parameter of the power generation system comprises power output, exhaust temperature, compressor condition, or any combination thereof.

16. The machine-readable-medium of claim 14, wherein the model comprises an adaptive real-time engine simulation model.

17. The machine-readable-medium of claim 14, wherein the model comprises a filter configured to fit each estimated value of the plurality of estimated values for the first parameter output by the model to a respective measured value of the plurality of measured values associated with the first parameter.

18. The machine-readable-medium of claim 17, wherein the filter comprises a Kalman filter gain matrix.

19. The machine-readable-medium of claim 14, wherein comparing the plurality of transfer functions to each other comprises comparing one or more reference points of a first transfer function of the plurality of transfer functions to one or more corresponding reference points associated with a second transfer function of the plurality of transfer functions.

20. The system of claim 1, wherein comparing the plurality of transfer functions to each other comprises at least comparing a first set of reference points of a first transfer function of the plurality of transfer functions to a second set of reference points of a second transfer function of the plurality of transfer functions.

* * * * *